No. 876,603. PATENTED JAN. 14, 1908.
E. G. STAUDE.
FLOUR PACKER.
APPLICATION FILED MAR. 23, 1904.

6 SHEETS—SHEET 1.

WITNESSES

INVENTOR
EDWIN G. STAUDE
BY
HIS ATTORNEYS

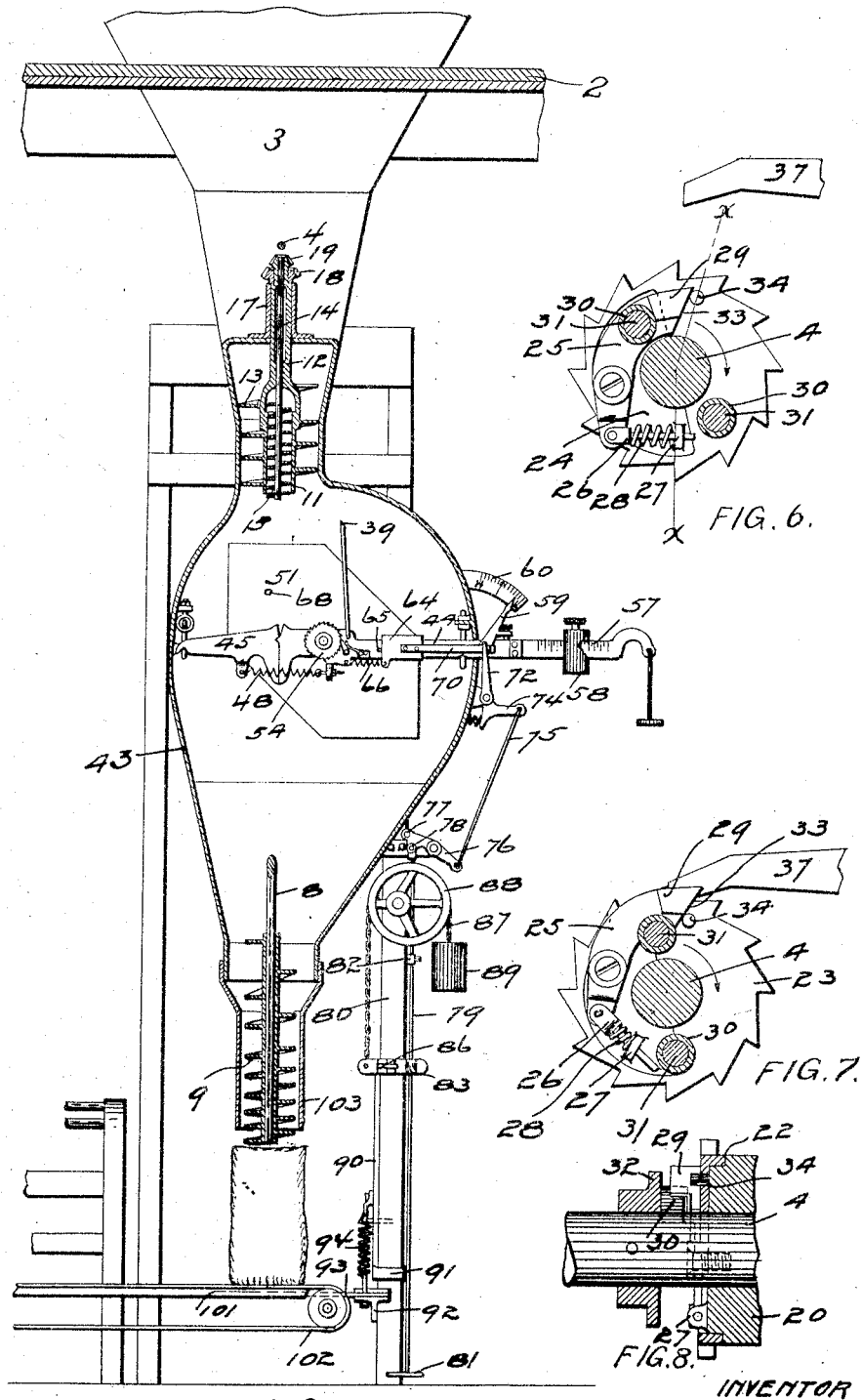

No. 876,603.

PATENTED JAN. 14, 1908.

E. G. STAUDE.
FLOUR PACKER.
APPLICATION FILED MAR. 23, 1904.

6 SHEETS—SHEET 3.

WITNESSES

INVENTOR
EDWIN G. STAUDE
BY
HIS ATTORNEYS

No. 876,603.

PATENTED JAN. 14, 1908.

E. G. STAUDE.
FLOUR PACKER.
APPLICATION FILED MAR. 23, 1904.

6 SHEETS—SHEET 4.

WITNESSES

INVENTOR
EDWIN G. STAUDE
BY
HIS ATTORNEYS

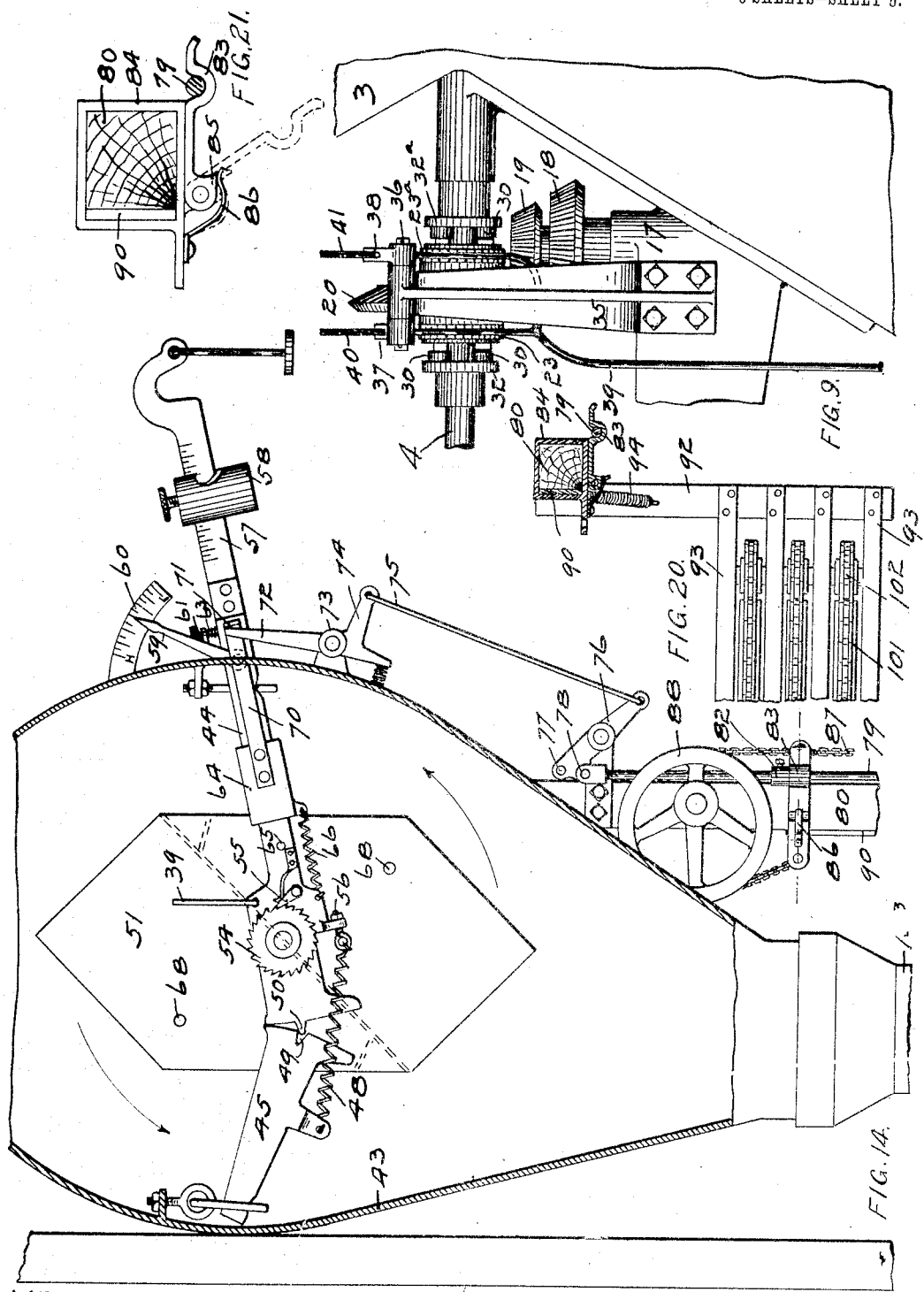

No. 876,603. PATENTED JAN. 14, 1908.
E. G. STAUDE.
FLOUR PACKER.
APPLICATION FILED MAR. 23, 1904.
6 SHEETS—SHEET 6.
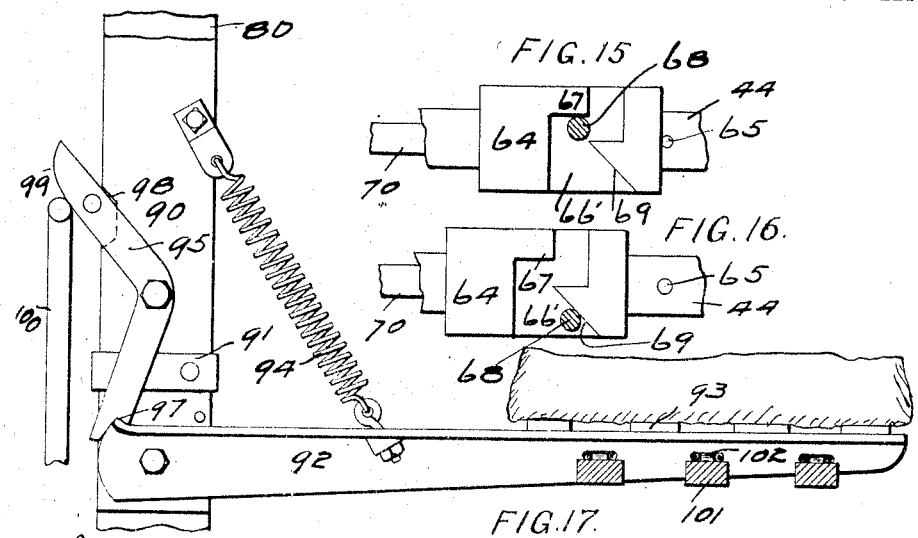
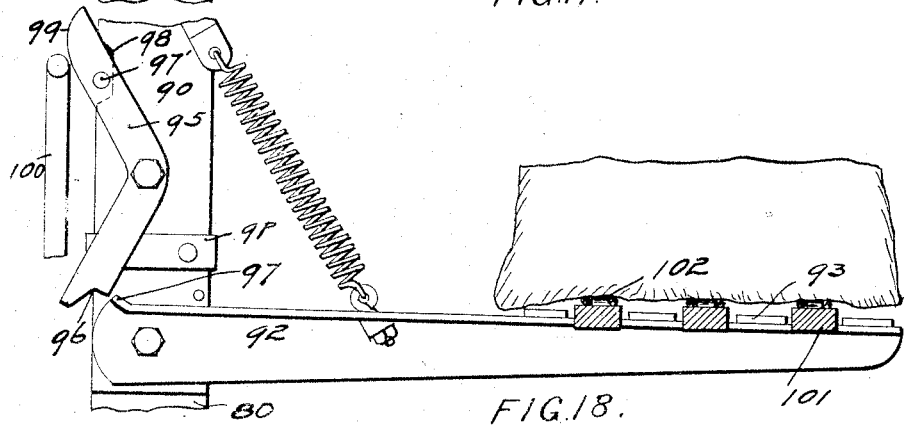
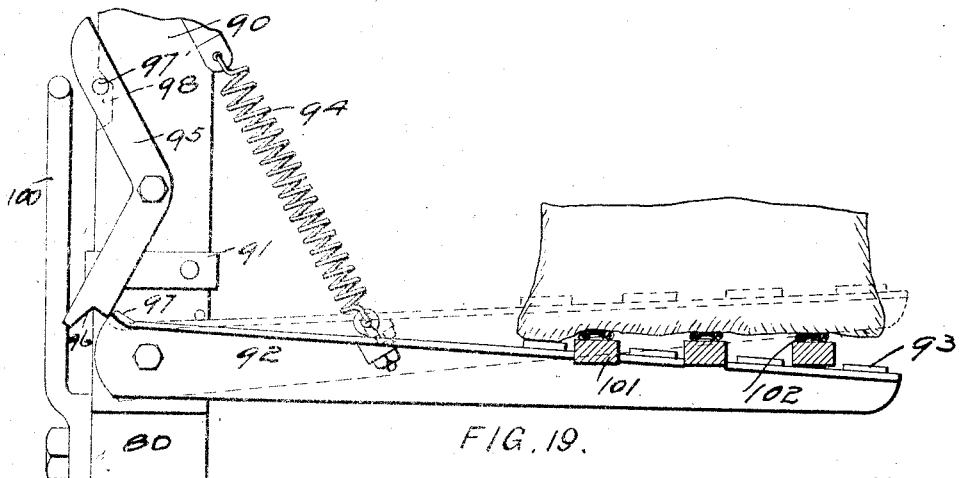
WITNESSES
INVENTOR
EDWIN G. STAUDE
BY
HIS ATTORNEYS

UNITED STATES PATENT OFFICE.

EDWIN G. STAUDE, OF MINNEAPOLIS, MINNESOTA.

FLOUR-PACKER.

No. 876,603.        Specification of Letters Patent.        Patented Jan. 14, 1908.

Application filed March 23, 1904. Serial No. 199,645.

*To all whom it may concern:*

Be it known that I, EDWIN G. STAUDE, of Minneapolis, Hennepin county, Minnesota, have invented certain new and useful Improvements in Flour-Packers, of which the following is a specification.

In the operation of a flour packer it is customary to pack the flour and then weigh the filled sack, adding to or deducting from the sack until the scale balances. This method of packing has been found slow and laborious and is generally unsatisfactory as the sacks frequently run over or under in weight unless great care is exercised in filling them.

The primary object, therefore, of my invention is to provide a packer wherein all weighing of the filled sack is dispensed with, the amount of flour delivered to each sack being the exact weight intended for such sack.

The invention consists generally in providing a flour packer with a mechanism for weighing the flour prior to its delivery to the packing auger or screw.

Further the invention consists in a primary and a secondary feed mechainsm for delivering flour to the weighing device.

Further the invention consists in a tripping mechanism for automatically dumping the flour when the scale balances.

Further the invention consists in a sack platform and a conveyer operating in connection therewith.

Further the invention consists in various constructions and combinations, all as hereinafter described and particularly pointed out in the claims.

Figures 1, 22:
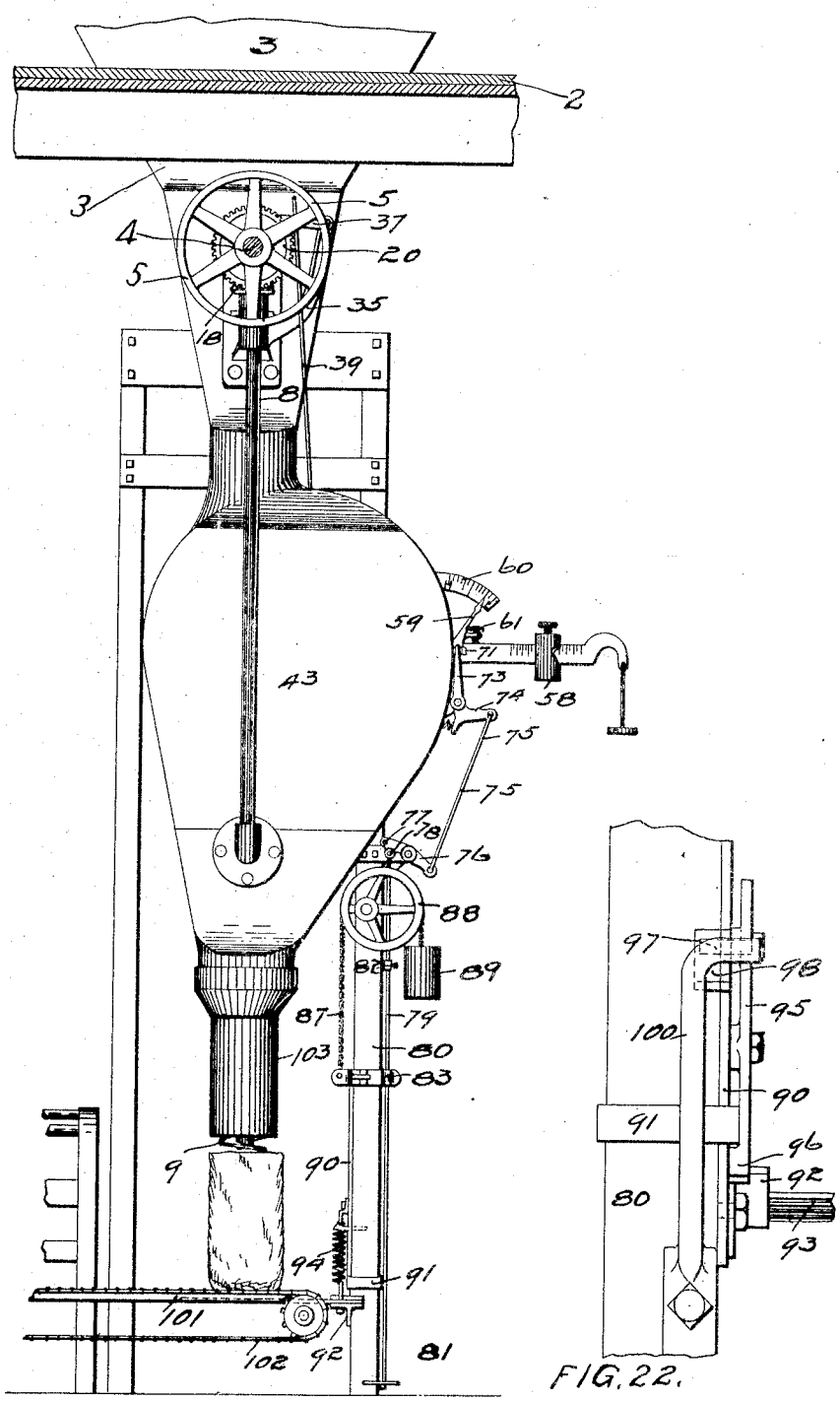
Figures 3, 4, 5:
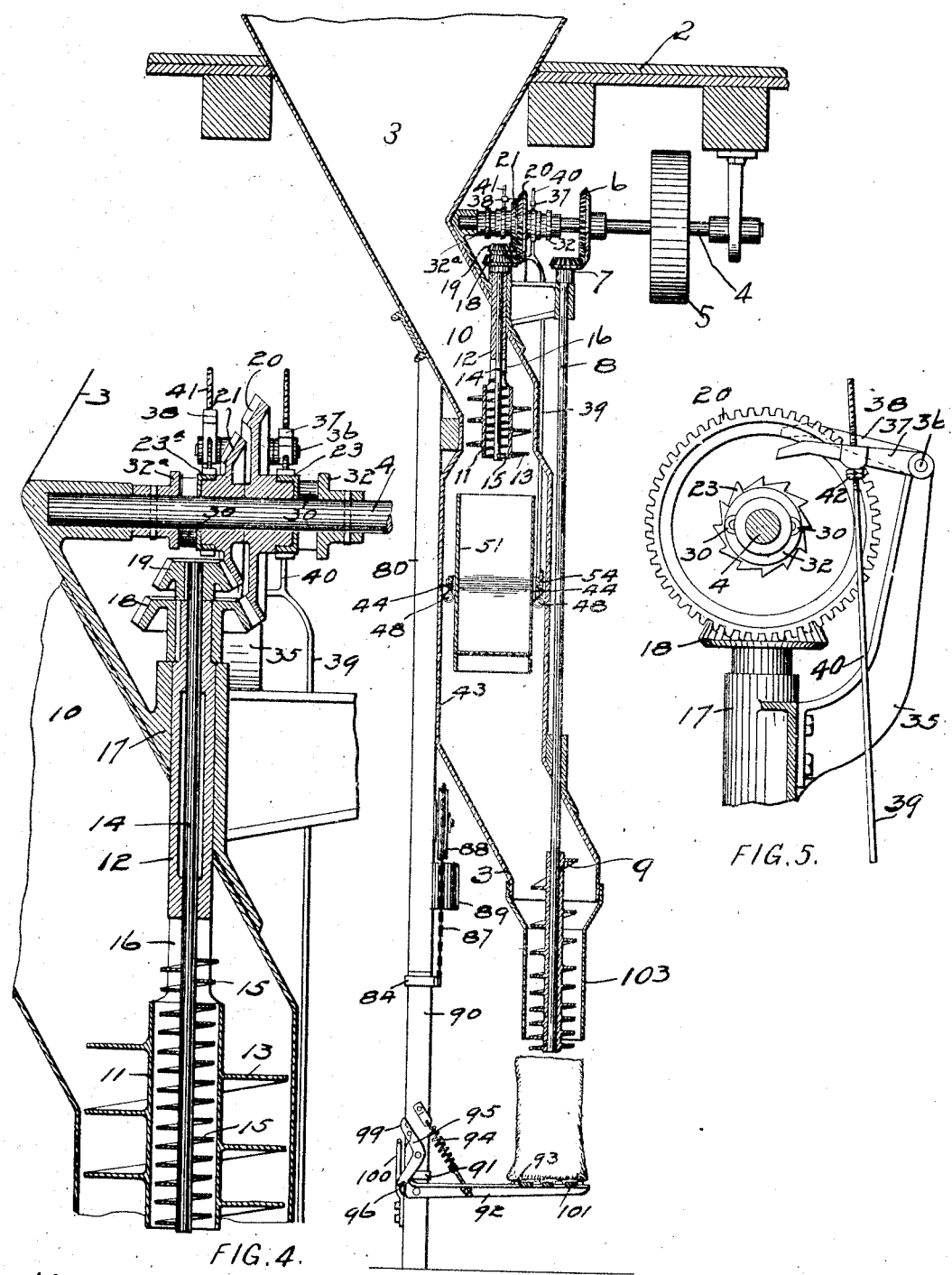
Figure 10:
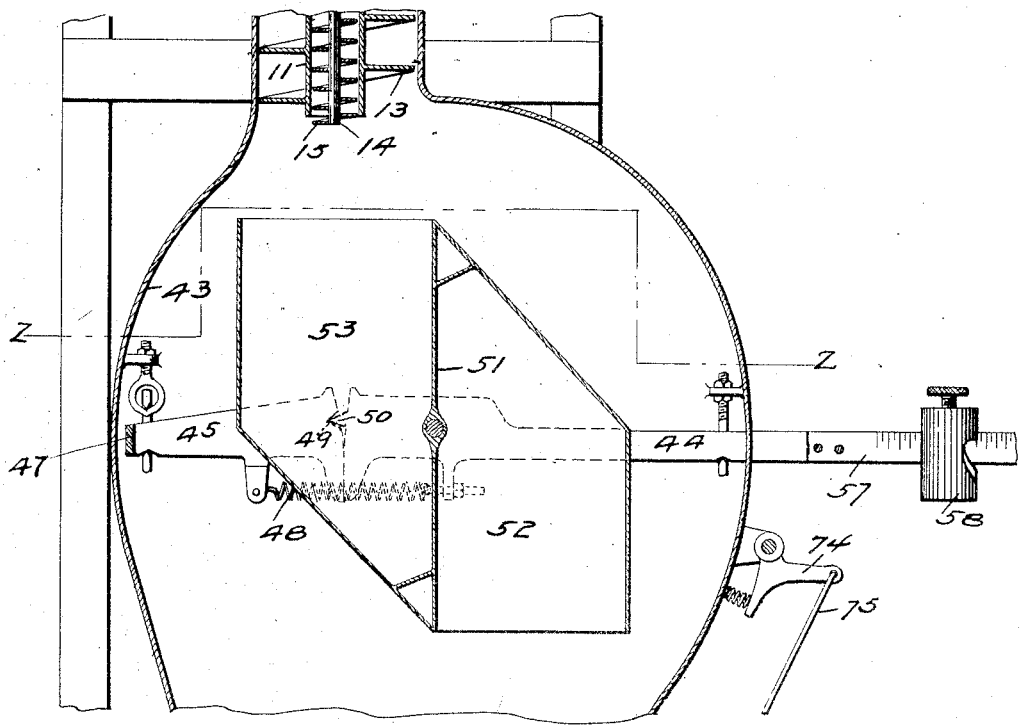
Figures 12, 13:
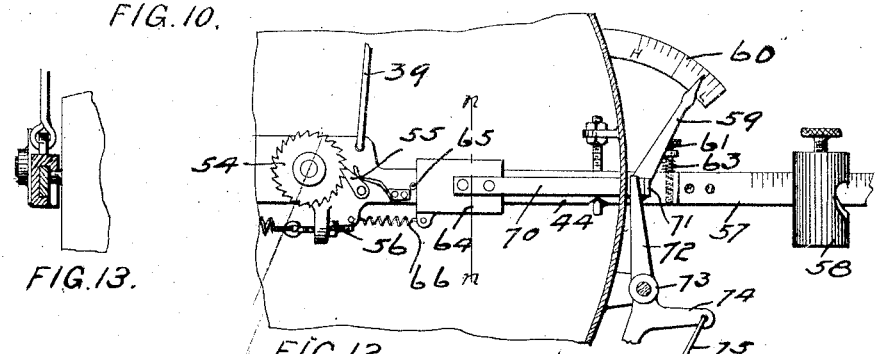
Figure 11:
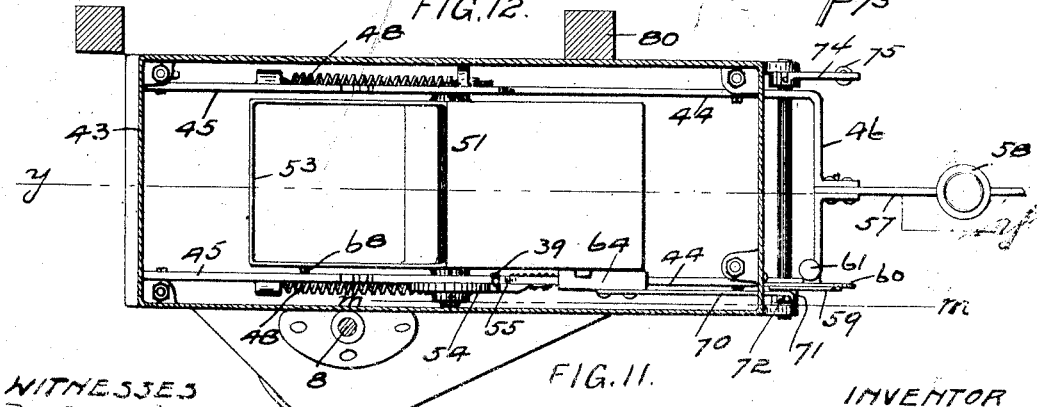

In the accompanying drawings, forming part of this specification,

Figure 1 is a front elevation of a flour packer, embodying my invention. Fig. 2 is a vertical sectional view of the same. Fig. 3 is a similar view taken on a line substantially at right angles to the section line of Fig. 2. Fig. 4 is a vertical sectional view of the primary and secondary feed devices and the mechanism for operating the same. Figs. 5, 6 and 7 are details of the clutch mechanism through which the primary and secondary feed devices are rendered operative and inoperative. Fig. 8 is a sectional view on the line $x$—$x$ of Fig. 6. Fig. 9 is a detail view looking toward the rear of the clutch mechanisms and the gears connected therewith for operating the feed device. Fig. 10 is a detail sectional view showing the position of the revolving hopper beneath the feed device, taken on the sectional line $y$—$y$ of Fig. 11. Fig. 11 is a horizontal section on the line $z$—$z$ of Fig. 10. Fig. 12 is a section on the line $m$—$m$ of Fig. 11. Fig. 13 is a section on the line $n$—$n$ of Fig. 12. Fig. 14 is a vertical sectional view showing the revolving hopper and the scale mechanism in their tilted position. Figs. 15 and 16 are details of the slide device mounted on the scale beam in the path of the revolving hopper. Figs. 17, 18 and 19 are detail views of the sack platform showing the different positions assumed thereby during the operation of filling the sack. Fig. 20 is a plan view, partially in section, showing the position of the conveyers with respect to the sack platform. Fig. 21 is a detail view showing the position to which the tripping finger or lever is moved to prevent the automatic dumping of the scale hopper. Fig. 22 is a detail view looking toward one end of the sack platform mechanism illustrated in Figs. 17, 18 and 19.

In the drawings, 2 represents a floor supporting a spout 3 through which the flour is delivered to the weighing and packing mechanism beneath.

4 is a shaft having a pulley 5 thereon and connected by gears 6 and 7 to a vertical continuously operating shaft 8 on the lower end of which the packing auger or screw 9 is secured.

A neck 10 is provided on the lower end of the spout 3 and within said neck I arrange a tube 11 secured on a shaft 12 and having a spirally arranged web 13 which, with said tube, closes substantially the passage through the neck 10 and forms the primary feed for the flour. A shaft 14 is provided within the shaft 12 and the tube 11 has a spiral web 15 at its lower end operating within said tube and forming, with said shaft, a secondary feed, an opening 16 being provided at the top of said tube to allow the entrance of the flour therein. The shaft 12 is mounted in a bearing 17 in the wall of a spout and the shaft 14 has a bearing in said shaft 12 and extends above the same and pinions 18 and 19 are secured on said shafts and mesh respectively with gears 20 and 21 loosely mounted on a driving shaft 4. The hubs of the gears 20 and 21 are provided with annular recesses 22 to receive the flanged edges of ratchets 23 and 23ª that are loose on the said shaft 4. These ratchets have openings 24 on one side, as indicated in Figs. 6 and 7, and over said openings dogs 25 and 25ª are pivoted on the hubs of the respective gears 20 and 21 and are provided at one end with pins 26 adapted to slide in lugs 27 on said hubs and carrying springs 28 which tend to press the opposite end of said dogs toward the center of their respective ratchets. A lug 29 is provided on the free end of each dog projecting into the path of pins 31 that are secured to opposite sides of collars 32 and 32ª fixed on the shaft 4. The free ends of the dogs 25 and 25ª have inclined or beveled surfaces 33 that contact with pins 34 in the surfaces of said ratchets.

The rollers 30 on one side of the collars normally engage the lugs 29 and revolve the ratchets and with them the gears 20 and 21. When, however, the movement of the ratchets is arrested the pins 34 bearing on the inclined surface 33 will press the dogs outwardly until the rollers 30 clear the lugs 29 when the connection between the shaft 4 and the gears will be interrupted and movement of the latter will cease. I prefer to provide two of the anti-friction rollers 30 and the pins 31, one upon each side of the shaft, so that in case a ratchet is released just as the roller is passing the dog it will not be necessary for it to make a complete revolution before the gears will again be set in motion to arrest movement of the ratchets and stop the gears 20 and 21 and the feed mechanisms driven thereby. I provide a bracket 35 supporting a shaft 36 whereon pawls 37 and 38 are loosely mounted. A rod 39 has arms 40 and 41 that are slidably connected with the pawls 37 and 38, respectively, and have nuts 42 on a threaded portion of said arms and by means of which said pawls can be raised or lowered to vary their position with respect to the ratchets 23 and 23ª (see Fig. 5). The nuts are so adjusted that one pawl will be normally higher than the other and the depression of the rod 39 a certain distance will cause one of the pawls to engage its ratchet and lock the same, and a further depression of said rod will cause the other pawl to engage its ratchet and stop its further movement also. These clutch mechanisms and the device for operating the same control the movement of the primary and secondary feed. The outer or primary feed screw operates for a certain period until movement of the weighing mechanism takes place and through the mechanism described stops the feed through the primary screw. The secondary feed, however, continues until the scale exactly balances when it will also be stopped. This is mechanical adaptation of the usual method employed of mechanically filling a sack with flour and then putting in a little more by hand, to balance the scale. The primary feed delivers a large quantity to the scale hopper and stops and then the secondary feed delivers a small quantity to balance the scale.

Below the feed device I provide a shell or casing 43 wherein the weighing mechanism proper is arranged. This consists of a pair of scale beams 44 and 45 arranged end to end, connected by cross-bars 46 and 47 and supported within the said casing upon knife edge bearings in the usual way. The abutting ends of the opposite beams are connected by coil springs 48 and said ends are slightly rounded, (as shown in Fig. 14) and the beams 45 are provided with recesses 49 to receive lugs 50 on the opposite beams.

A revolving hopper 51 having chambers 52 and 53 is pivotally supported in bearings between the beams 44 and the openings to the said chambers are oppositely arranged, one being on the upper and the other on the lower side of said hopper in position to receive and discharge the material that is being weighed. The hopper revolves intermittently in one direction and when one chamber is filled and the hopper released it will turn on its pivots and empty one chamber while the opposite one will be swung into the filling position.

Backward movement of the hopper is prevented by the ratchet 54 and the spring pressed pawl 55. The tension of the springs 48 and the tilting of the scale beams is regulated by means of the adjustable pins 56. A graduated beam 57 having a weight 58 is provided on the cross-bar 46 and an indicating hand 59 is pivoted on one of the beams 44 and is movable over a scale 60. This scale has the letter H at one end and L at the other and the graduations are so arranged that when the indicator hand passes a certain point the operator will know that the sack being filled is too heavy or too light, according to whichever side of the mark the pointer moves. The pointer is adjusted to its proper normal position on the scale by means of a screw 61 passing loosely through a lug on said pointer into the scale beam and carrying a coil spring 63.

A slide 64 is mounted on one of the beams 44 and normally held against a pin 65 in said beam by a spring 66. This slide is provided on its inner face with a groove 66′ having a shoulder 67 to engage a pin 68 provided on each end of the revolving hopper. As long as the slide is in contact with the pin 65 the shoulder 67 will prevent the hopper from turning but as soon as the slide is moved away from its stop pin the pin 68 will slip out of the slot 66′ and allow the hopper to revolve. I prefer to provide a stop 69 on the slide 64 having an inclined face against which the pin 68 strikes to prevent the hopper from making a second revolution in case the slide should not be returned to its normal position when the hopper has completed its first revolution.

A strap 70 is secured on the slide 64 having a hook 71 at its outer end extending without the casing 43 in position to be engaged by one arm 72 of a bell crank 73. The other arm 74 of said bell crank is connected by a link 75 with one end of a lever 76 whose opposite end is provided with holes 77 and 78, the latter of which is attached to a longitudinally movable rod 79 arranged beside the post 80 and provided with a pedal 81. The purpose of the hole 77 is to allow the link 75 to be adjusted to either end of the lever 76, according to whether the device is operated automatically or by means of the pedal, as will hereinafter appear from the description of the operation of the machine.

The lower end of the rod 39 is attached to one of the scale beams 44 (see Figs. 2, 12 and 14) and when a sufficient quantity of flour or other material has been deposited in one of the hopper chambers and the scale beam has been tripped and allowed to tilt, the downward movement of the beam will draw down the rod 39 until the clutch mechanism that controls the movement of the primary feed has been operated and further movement of the feed arrested. The secondary feed will continue to deliver flour to the hopper until the beam has been tilted sufficiently to operate the clutch mechanism that controls the movement of the secondary feed, whereupon this secondary feed will be stopped also.

In a machine of this kind it is desirable to provide mechanism for releasing the hopper, allowing it to discharge its contents when a filled sack has been removed from the platform and an empty one put in place thereof. I therefore provide an adjustable collar 82 on the rod 79 in the path of a finger 83 carried by a band 84 and having a lug 85 engaged by a spring 86 which tends to hold said finger in yielding engagement with the rod 79 to allow it to be swung around to the position indicated by dotted lines in Fig. 21, to prevent the automatic tripping of the scale hopper.

The band 84 is vertically slidable on the post 80 and is connected to a chain 87 that passes over an eccentrically mounted wheel 88 and carries a weight 89 that normally tends to raise the finger 83 into contact with the collar 82. The band 84 is connected by a plate 90 with a similar band 91 below the band 84 and slidable on said post. A bar 92 is pivoted at one end on said plate and provided at its opposite end with a series of laterally extending arms 93 arranged at intervals. A spring 94 connects the plate 90 with the bar 92 and normally tends to hold said bar in a horizontal position. A bell crank 95 is pivoted on said plate 90 and has a notch 96 in its lower arm to receive the heel 97 of the bar 92 and lock said bar against downward movement. The upper end of said bell crank is provided with a pin 97' adapted to enter a recess 98 in said plate and post and lock said plate against upward movement. The recess has beveled sides, as shown in Figs. 17, 18 and 19, to allow the pin to be readily disengaged therefrom. The upper arm of the bell crank has a beveled edge 99, and an arm 100 is secured on the post 80 in the path of said curved edge to engage the same, tilt the bell crank 95, press the pin 97' into the recess 98 and release the bar 92. Between the arms 93 I provide slats 101 over which conveyer belts 102 are arranged to operate. These belts are below the normal level of the arms 93 and do not contact with the bottom of the sack to move it away until the sack platform has been depressed sufficiently by the weight of the flour to bring the bell crank 95 into engagement with the arm 100 and release the bar 92. As soon, however, as the bar is released by the tilting of the bell crank the weight of the sack will depress it sufficiently to bring the arms 93 below the level of the conveyer chains, when the sack will be taken away, and during this time vertical movement of the plate 90 and the sack platform will be prevented by the engagement of the pin 97' with the recess 98 and it will be impossible for the pin to pass out of said recess until the heel 97 of the bar 92 has been depressed sufficiently to allow the notched lower arm of the bell crank to return to its normal position. After the filled sack has passed off the platform the spring 94 will return the bar 92 to its normal position, allowing the heel 97 to enter the notch 96 in the bell crank and the opposite movement of the other end of said crank will allow the pin 97' to pass out of the recess when the weight 89 will lift the platform and trip the scale mechanism and allow the hopper to discharge its contents. As soon as the flour or other material passes out of the hopper the scale will return to its normal position and the feed mechanism will be set in motion to fill the hopper so that by the time the filled sack has been discharged from the platform another sack full of flour will be delivered to the hopper.

The usual tube 103 is provided around the packing auger 9 and (as clearly shown in Fig. 3) I prefer to vary the pitch of the thread or web on the auger for the purpose of drawing the material down and partially compressing it while still in the tube. The operation of packing the flour in the sack is the same as that generally employed in machines of this character and needs no detailed description herein.

The following is a brief description of the operation of my machine. The sack platform having been raised to its elevated position by the weight 89 will contact with the collar 82, oscillate the bell crank arm 73, move the slide connected therewith and release the hopper. The tilting of the scale beam will, through its connection 39 with the feed device clutch mechanisms successively stop the primary and secondary feed devices and cause them to remain stationary during the dumping operation of the hopper. The weight of the flour or other material in one of the chambers of the hopper will cause it to revolve and discharge its contents and present an empty chamber or pocket to receive the next discharge from the feed device. The flour discharged from the auger will flow into the packing auger and be delivered to the sack in the usual way. As the platform descends by the weight of the sack the leverage of the weight 89 is accordingly increased on the platform through the eccentrically mounted wheel 88. As soon as the bell crank 95 engages the arm 100 the pin 97' will be forced into the recess 98, releasing the bar 92 and locking it and the plate 90 against vertical movement. The weight of the sack will then be thrown on the spring 94 which will stretch sufficiently to allow the arms 93 to drop down between the conveyer chains which engaging the bottom of the sack will carry it away from the platform. The bar 92 will then swing upward, allowing the bell crank 95 to assume its normal position and the platform will then be raised by the weight 89 to again trip the hopper which is in process of being filled by the action of the primary and secondary feed devices.

I have shown and described my invention used in connection with a flour packing machine but I do not wish to confine myself to this style of packer as the invention is equally well adapted for use with machines for packing other cereal products.

I claim as my invention:

1. In a packer, a feed mechanism comprising a primary and a secondary feed device concentrically and vertically arranged, and a mechanism for operating them.

2. In a packer, a feed mechanism comprising two concentrically and vertically arranged augers arranged to deliver a comparatively large and a small quantity of material, respectively, and means for operating said feed mechanism for the purpose specified.

3. In a packer, a feed mechanism comprising two concentrically and vertically arranged augers, one constituting a primary and the other a secondary feed, and mechanism for starting said augers simultaneously and operating said secondary feed after the movement of the primary feed has been arrested and means for arresting the movement of said primary feed.

4. In a packer, a tilting scale beam, a hopper carried thereby, a movable sack platform and mechanism preventing premature movement of said hopper and actuated by the movement of said platform to release said hopper.

5. In a packer, a scale beam, a revolving hopper having oppositely arranged chambers, a movable sack platform and mechanism preventing premature movement of said hopper and arranged to be actuated by the movement of said platform to release said hopper.

6. In a packer, a scale mechanism and revolving hopper carried thereby, mechanism preventing premature movement of said hopper and comprising a grooved slide having a suitable stop, and a pin on said hopper adapted to enter said slot, a feed mechanism, and operative connections provided between said feed mechanism and said scale.

7. In a packer, a scale mechanism, a revolving hopper having oppositely arranged chambers or pockets, a movable sack platform mechanism controlled by the movement of said platform for preventing premature movement of said hopper, a feed device arranged to successively deliver a large and a comparatively small quantity of material to one of said hopper pockets, mechanism for operating said feed device, and operative connections provided between said operating mechanism and said scale.

8. In a packer, a scale and a revolving hopper carried thereby having oppositely arranged pockets or chambers, pins provided on said hopper, a slide having a slot to receive said pins, and a stop to engage them one at a time and automatically lock said hopper, and mechanism for operating said slide, for the purpose specified.

9. In a packing machine, the combination with a packing auger, of a scale mechanism, a tilting hopper or pan therefor, concentrically and vertically arranged feed augers, mechanism for operating said augers and mechanism controlled by the movement of said hopper for throwing said auger operating mechanism into and out of operation.

10. In a packing machine, the combination, with a packing auger, of a scale, a tilting hopper therefor, concentrically and vertically arranged feed augers and means for operating the same, mechanism controlled by the movement of said hopper for throwing said auger operating means into and out of operation and said feed augers being started simultaneously and one being operated for a longer period than the other to deliver respectively a comparatively large and small amount of material to said hopper.

11. In a packing machine, the combination with a packing auger, of a scale, a tilting hopper therefor, means for normally locking said hopper to prevent premature tilting of the same, a vertically movable sack platform a feed device operatively connected with said scale, and mechanism controlled by the movement of said platform for automatically releasing said hopper, substantially as described.

12. In a packing machine, a revolving scale hopper having oppositely arranged pockets or chambers, means for preventing premature movement of said hopper, and said means having a device to prevent two continuous revolutions of said hopper.

13. The combination of a spiral conveyer having a hollow tubular shaft, a second spiral conveyer extending longitudinally through said tubular shaft, means for supplying material to said conveyers, and mechanism for separately driving said conveyers.

14. In a packing machine, a vertically movable sack platform, mechanism for temporarily locking said platform against vertical movement, a scale mechanism, a hopper therefor, and mechanism for locking said hopper against premature movement and arranged to be actuated by the vertical movement of said platform to release said hopper.

15. In a packing machine, a revolving hopper, a primary and a secondary feed device arranged to deliver material to said hopper, a scale mechanism connected with said hopper and controlling said feed devices, and a vertically movable sack platform arranged to control the movement of said hopper.

In witness whereof, I have hereunto set my hand this 19th day of March, 1904.

EDWIN G. STAUDE.

In presence of—
M. HAGERTY,
RICHARD PAUL.